(12) United States Patent
Takahashi et al.

(10) Patent No.: US 10,779,267 B2
(45) Date of Patent: Sep. 15, 2020

(54) TERMINAL APPARATUS THAT PERFORMS NPUSCH TRANSMISSION, BASE STATION APPARATUS THAT PERFORMS NPUSCH RECEPTION, METHOD FOR NPUSCH TRANSMISSION, AND METHOD FOR NPUSCH RECEPTION (71) Applicant: SHARP KABUSHIKI KAISHA, Sakai, Osaka (JP)

(72) Inventors: Hiroki Takahashi, Sakai (JP); Shoichi Suzuki, Sakai (JP); Shohei Yamada, Sakai (JP); Kazunari Yokomakura, Camas, WA (US)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 75 days.

(21) Appl. No.: 16/085,721

(22) PCT Filed: Feb. 1, 2017

(86) PCT No.: PCT/JP2017/003628
§ 371 (c)(1),
(2) Date: Sep. 17, 2018

(87) PCT Pub. No.: WO2017/159098
PCT Pub. Date: Sep. 21, 2017

(65) Prior Publication Data
US 2019/0116581 A1  Apr. 18, 2019

(30) Foreign Application Priority Data

Mar. 18, 2016 (JP) .................................. 2016-054998

(51) Int. Cl.
*H04W 4/00* (2018.01)
*H04W 72/04* (2009.01)
(Continued)

(52) U.S. Cl.
CPC ......... *H04W 72/042* (2013.01); *H04L 5/0048* (2013.01); *H04L 5/0051* (2013.01);
(Continued)

(58) Field of Classification Search
None
See application file for complete search history.

(56) References Cited

U.S. PATENT DOCUMENTS

| | | | |
|---|---|---|---|
| 9,214,997 B2 * | 12/2015 | Han ..................... | H04B 7/0689 |
| 2014/0219202 A1 * | 8/2014 | Kim ..................... | H04L 1/1861 |
| | | | 370/329 |

(Continued)

OTHER PUBLICATIONS

Huawei, Hisilicon, Revised Work Item: Narrowband IoT (Nb-IoT), 3GPP TSG RAN Meeting #70, RP-152284, Sitges, Spain, Dec. 7-10, 2015.

(Continued)

*Primary Examiner* — Elisabeth Benoit Magloire
(74) *Attorney, Agent, or Firm* — ScienBiziP, P.C.

(57) ABSTRACT

The present invention allows for an efficient communication between a terminal apparatus and a base station apparatus. The terminal apparatus generates and transmits a reference signal associated with a transmission of a Narrow Band Physical Uplink Shared Channel (NPUSCH) in a subframe. A plurality of first subcarriers include a plurality of second subcarriers and a plurality of third subcarriers, and a plurality of fourth subcarriers include a plurality of fifth subcarriers and a plurality of sixth subcarriers. In a case that the NPUSCH is mapped to the plurality of second subcarriers or the plurality of third subcarriers, the reference signal is mapped to the plurality of first subcarriers, and in a case that the NPUSCH is mapped to the plurality of fifth subcarriers or the plurality of sixth subcarriers, the reference signal is mapped to the plurality of fourth subcarriers.

6 Claims, 10 Drawing Sheets

(51) Int. Cl.
  *H04L 27/26* (2006.01)
  *H04L 5/00* (2006.01)
  *H04L 27/156* (2006.01)

(52) U.S. Cl.
  CPC ........ *H04L 27/156* (2013.01); *H04L 27/2607* (2013.01); *H04L 27/2611* (2013.01); *H04W 72/04* (2013.01); *H04W 72/0413* (2013.01); *H04W 72/0446* (2013.01); *H04W 72/0453* (2013.01); *H04L 5/001* (2013.01); *H04L 5/0044* (2013.01); *H04L 5/0094* (2013.01); *Y02D 70/00* (2018.01); *Y02D 70/10* (2018.01); *Y02D 70/12* (2018.01); *Y02D 70/126* (2018.01)

(56) References Cited

U.S. PATENT DOCUMENTS

| | | | |
|---|---|---|---|
| 2014/0269460 A1* | 9/2014 | Papasakellariou | H04L 5/1469 370/294 |
| 2016/0057784 A1* | 2/2016 | You | H04W 88/04 370/329 |
| 2016/0234809 A1* | 8/2016 | Han | H04W 36/04 |
| 2016/0269939 A1* | 9/2016 | Papasakellariou | H04L 1/00 |
| 2017/0201967 A1* | 7/2017 | Yang | H04L 5/143 |
| 2017/0374675 A1* | 12/2017 | Hwang | H04W 72/04 |

OTHER PUBLICATIONS

Pudney, Chris et al., Status Report to TSG—NarrowBand IOT, 3GPP TSG RAN meeting #70, RP-151931, Sitges, Spain, Dec. 7-10, 2015.
LTE; Evolved Universal Terrestrial Radio Access (E-UTRA); Radio Resource Control (RRC); Protocol specification (3GPP TS 36.331 version 13.0.0 Release 13), ETSI TS 136 331 V13.0.0 (Jan. 2016).
LTE; Evolved Universal Terrestrial Radio Access (E-UTRA); Medium Access Control (MAC) protocol specification (3GPP TS 36.321 version 13.0.0 Release 13) ETSI TS 136 321 V13.0.0 (Feb. 2016).
LTE; Evolved Universal Terrestrial Radio Access (E-UTRA); Physical layer procedures (3GPP TS 36.213 version 13.0.0 Release 13) ETSI TS 136 213 V13.0.0 (May 2016).
LTE; Evolved Universal Terrestrial Radio Access (E-UTRA); Multiplexing and channel coding 3GPP TS 36.212 version 13.0.0 Release 13) ETSI TS 136 212 V13.0.0 (Jan. 2016).
LTE; Evolved Universal Terrestrial Radio Access (E-UTRA); Physical channels and modulation 3GPP TS 36.211 version 13.0.0 Release 13) ETSI TS 136 211 V13.0.0 (Jan. 2016).
Intel Corporation, "NB-IoT Uplink Shared Channel Design", R1-160131, 3GPP TSG RAN WG1 NB-IoT Ad-Hoc Meeting Budapest, Hungary, Jan. 18-20, 2016.
LG Electronics, "Discussions on uplink narrowband DMRS for NB-IoT", R1-161971, 3GPP TSG RAN WG1 NB-IoT Ad-Hoc Meeting Sophia Antipolis, France, Mar. 22-24, 2016.
Intel Corporation, "On Downlink HARQ-ACK feedback for NB-IoT", R1-160133, 3GPP TSG RAN WG1 NB-IoT Ad-Hoc Meeting Budapest, Hungary, Jan. 18-20, 2016.

* cited by examiner

TERMINAL APPARATUS THAT PERFORMS NPUSCH TRANSMISSION, BASE STATION APPARATUS THAT PERFORMS NPUSCH RECEPTION, METHOD FOR NPUSCH TRANSMISSION, AND METHOD FOR NPUSCH RECEPTION

TECHNICAL FIELD

The present invention relates to a terminal apparatus, a base station apparatus, a communication method, and an integrated circuit.

BACKGROUND ART

The 3rd Generation Partnership Project (3GPP) has been working to standardize a radio access method and a radio network for cellular mobile communications (hereinafter, referred to as "Long Term Evolution (LTE)", or "Evolved Universal Terrestrial Radio Access (EUTRA)") (NPLs 1, 2, and 3). In LTE, a base station apparatus is also referred to as an evolved NodeB (eNodeB), and a terminal apparatus is also referred to as a User Equipment (UE). LTE is a cellular communication system in which multiple areas covered by the base station apparatuses are deployed to form a cellular structure. A single base station apparatus may manage multiple cells.

3GPP has been working to standardize Narrow Band-Internet of Things (NB-IoT) for reducing costs of terminal apparatuses and reducing power consumption of terminal apparatuses. (NPL 6). For the NB-IoT uplink, transmission using one tone or a plurality of tones (e.g., 3 tones, 6 tones, and 12 tones) is supported (NPL 7).

CITATION LIST

Non Patent Literature

NPL 1: "3GPP TS 36.211 V13.0.0 (2015-12)", 6 Jan. 2016.
NPL 2: "3GPP TS 36.212 V13.0.0 (2015-12)", 6 Jan. 2016.
NPL 3: "3GPP TS 36.213 V13.0.0 (2015-12)", 6 Jan. 2016.
NPL 4: "3GPP TS 36.321 V13.0.0 (2015-12)", 14 Jan. 2016.
NPL 5: "3GPP TS 36.331 V13.0.0 (2015-12)", 7 Jan. 2016.
NPL 6: "Status Report for WI: NarrowBand IOT", RP-151931, Vodafone, Huawei, Ericsson, Qualcomm, 3GPP TSG RAN Meeting #70, Sitges, Spain, 7-10 Dec. 2015.
NPL 7: "Revised Work Item: Narrowband IoT (NB-IoT)", RP-152284, Huawei, HiSilicon, 3GPP TSG RAN Meeting #70, Sitges, Spain, 7-10 Dec. 2015.

SUMMARY OF INVENTION

Technical Problem

The present invention provides a terminal apparatus capable of efficiently communicating with a base station apparatus, a base station apparatus communicating with the terminal apparatus, a communication method used for the terminal apparatus, a communication method used for the base station apparatus, an integrated circuit mounted on the terminal apparatus, and an integrated circuit mounted on the base station apparatus. For example, the communication methods used for the terminal apparatus and the base station apparatus may include an uplink transmission method, a modulation method, and/or a coding method for reducing interference between cells and/or between terminal apparatuses.

Solution to Problem (1) According to some aspects of the present invention, the following measures are provided. That is, a first aspect of the present invention is a terminal apparatus including: a generation unit configured to generate a reference signal associated with a transmission of an NPUSCH in a subframe, and a transmitter configured to transmit the reference signal, wherein a plurality of first subcarriers include a plurality of second subcarriers and a plurality of third subcarriers, a plurality of fourth subcarriers include a plurality of fifth subcarriers and a plurality of sixth subcarriers, in a case that the NPUSCH is mapped to the plurality of second subcarriers or the plurality of third subcarriers, the reference signal is mapped to the plurality of first subcarriers, and in a case that the NPUSCH is mapped to the plurality of fifth subcarriers or the plurality of sixth subcarriers, the reference signal is mapped to the plurality of fourth subcarriers.

(2) A second aspect of the present invention is a base station apparatus including: a receiver configured to receive a reference signal associated with reception of an NPUSCH in a subframe, and a channel estimation unit configured to estimate performance of a channel used for the NPUSCH from the reference signal, wherein a plurality of first subcarriers include a plurality of second subcarriers and a plurality of third subcarriers, a plurality of fourth subcarriers include a plurality of fifth subcarriers and a plurality of sixth subcarriers, in a case that the NPUSCH is mapped to the plurality of second subcarriers or the plurality of third subcarriers, the reference signal is mapped to the plurality of first subcarriers, and in a case that the NPUSCH is mapped to the plurality of fifth subcarriers or the plurality of sixth subcarriers, the reference signal is mapped to the plurality of fourth subcarriers.

(3) A third aspect of the present invention is a communication method used for a terminal apparatus, the communication method including: generating a reference signal associated with a transmission of an NPUSCH in a subframe; and transmitting the reference signal; wherein a plurality of first subcarriers include a plurality of second subcarriers and a plurality of third subcarriers, a plurality of fourth subcarriers include a plurality of fifth subcarriers and a plurality of sixth subcarriers, in a case that the NPUSCH is mapped to the plurality of second subcarriers or the plurality of third subcarriers, the reference signal is mapped to the plurality of first subcarriers, and in a case that the NPUSCH is mapped to the plurality of fifth subcarriers or the plurality of sixth subcarriers, the reference signal is mapped to the plurality of fourth subcarriers.

(4) A fourth aspect of the present invention is a communication method used for a base station apparatus, the communication method including: receiving a reference signal associated with reception of an NPUSCH in a subframe; and estimating performance of a channel used for the NPUSCH from the reference signal; wherein a plurality of first subcarriers include a plurality of second subcarriers and a plurality of third subcarriers, a plurality of fourth subcarriers include a plurality of fifth subcarriers and a plurality of sixth subcarriers, in a case that the NPUSCH is mapped to the plurality of second subcarriers or the plurality of third subcarriers, the reference signal is mapped to the plurality of first subcarriers, and in a case that the NPUSCH is mapped to the plurality of fifth subcarriers or the plurality of sixth subcarriers, the reference signal is mapped to the plurality of fourth subcarriers.

(5) A fifth aspect of the present invention is an integrated circuit mounted on a terminal apparatus, the integrated circuit including: a generation circuit configured to generate a reference signal associated with a transmission of an NPUSCH in a subframe; and a transmission circuit configured to transmit the reference signal; wherein a plurality of first subcarriers include a plurality of second subcarriers and a plurality of third subcarriers, a plurality of fourth subcarriers include a plurality of fifth subcarriers and a plurality of sixth subcarriers, in a case that the NPUSCH is mapped to the plurality of second subcarriers or the plurality of third subcarriers, the reference signal is mapped to the plurality of first subcarriers, and in a case that the NPUSCH is mapped to the plurality of fifth subcarriers or the plurality of sixth subcarriers, the reference signal is mapped to the plurality of fourth subcarriers.

(6) A sixth aspect of the present invention is an integrated circuit mounted on a base station apparatus, the integrated circuit including: a reception circuit configured to receive a reference signal associated with reception of an NPUSCH in a subframe; and a channel estimation circuit configured to estimate performance of a channel used for the NPUSCH from the reference signal; wherein a plurality of first subcarriers include a plurality of second subcarriers and a plurality of third subcarriers, a plurality of fourth subcarriers include a plurality of fifth subcarriers and a plurality of sixth subcarriers, in a case that the NPUSCH is mapped to the plurality of second subcarriers or the plurality of third subcarriers, the reference signal is mapped to the plurality of first subcarriers, and in a case that the NPUSCH is mapped to the plurality of fifth subcarriers or the plurality of sixth subcarriers, the reference signal is mapped to the plurality of fourth subcarriers.

Advantageous Effects of Invention

According to the present invention, a terminal apparatus and a base station apparatus can efficiently communicate with each other.

DESCRIPTION OF EMBODIMENTS

Embodiments of the present invention will be described below.

Long Term Evolution (LTE) (trade name) and Narrow Band Internet of Things (NB-IoT) may be defined as different Radio Access Technologies (RAT). NB-IoT may be defined as a technology included in LTE. The present embodiment is applied to NB-IoT, but may also be applied to LTE or other RATs.

Figure 1:
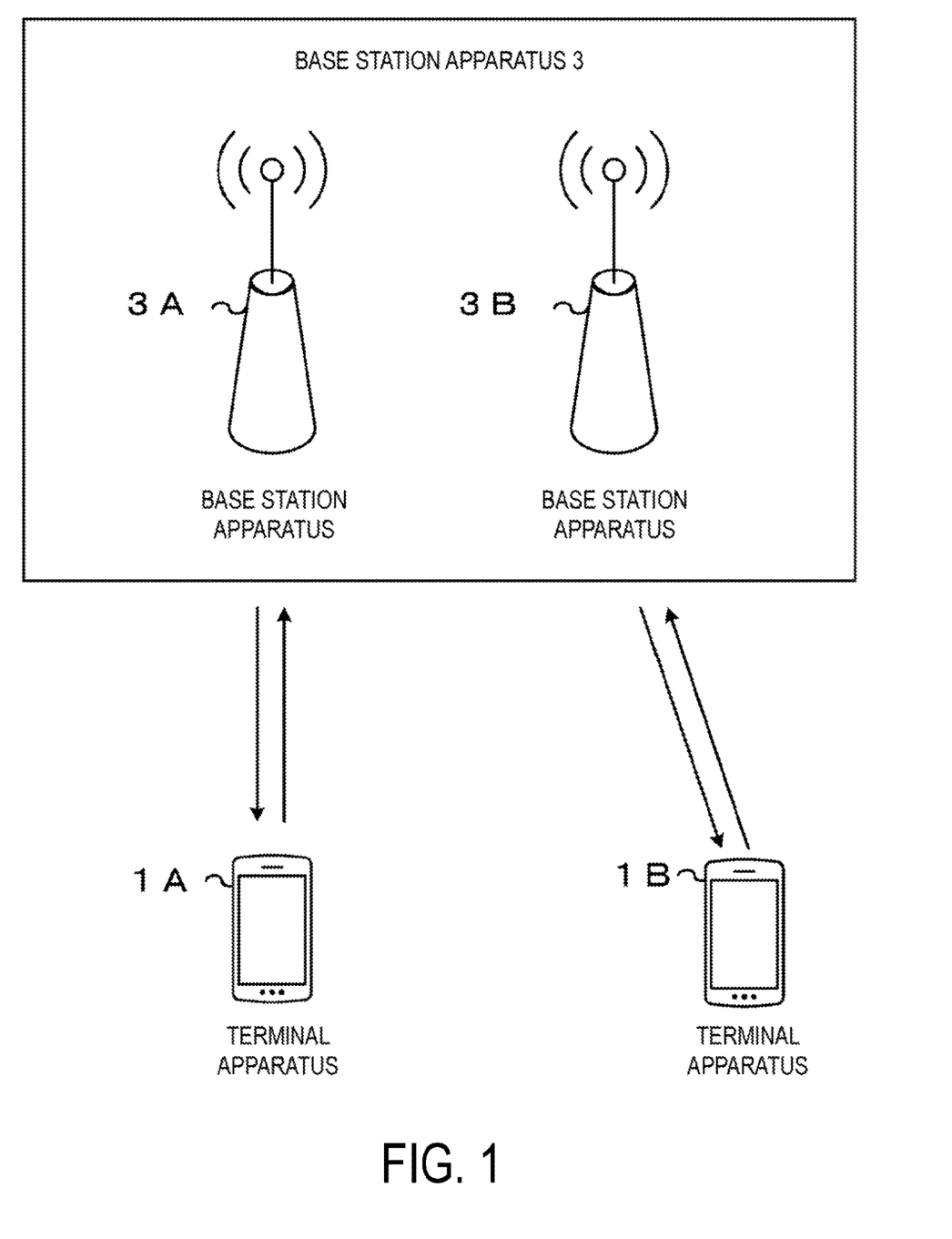
FIG. 1 is a conceptual diagram of a radio communication system according to the present embodiment.

FIG. 1 is a conceptual diagram of a radio communication system according to the present embodiment. In FIG. 1, the radio communication system includes a terminal apparatus 1A, a terminal apparatus 1B, a base station apparatus 3A, and a base station apparatus 3B. The terminal apparatus 1A and the terminal apparatus 1B are also referred to as a terminal apparatus 1. A base station apparatus 3 includes the base station apparatus 3A and the base station apparatus 3B. The base station apparatus 3A and the base station apparatus 3B may be defined as separate apparatuses. The base station apparatus 3 may include a core network apparatus.

The terminal apparatus 1A and the base station apparatus 3A communicate with each other by using NB-IoT. The terminal apparatus 1B and the base station apparatus 3B communicate with each other by using NB-IoT.

Time Division Duplex (TDD) and/or Frequency Division Duplex (FDD) is applied to a radio communication system in the present embodiment. In the present embodiment, one serving cell is configured for the terminal apparatus 1. The serving cell configured for the terminal apparatus 1 is also referred to as an NB-IoT cell.

The one configured serving cell may be one primary cell. The primary cell is a serving cell in which an initial connection establishment procedure has been performed, a serving cell in which a connection re-establishment procedure has been started, or a cell indicated as a primary cell during a handover procedure.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The present embodiment may be applied to three scenarios/modes, i.e., standalone, guard band, and in-band scenarios/modes. In the standalone mode, a channel bandwidth of the NB-IoT cell is not included in a channel bandwidth of an LTE cell. In the guard band mode, the channel bandwidth of the NB-IoT cell is included in a guard band of the LTE cell. In the in-band mode, the channel bandwidth of the NB-IoT cell is included in a transmission bandwidth of the LTE cell. For example, the guard band of the LTE cell is a band included in the channel bandwidth of the LTE cell but not included in the transmission bandwidth of the LTE cell. The present embodiment may be applied to any of these modes.

Figure 2:
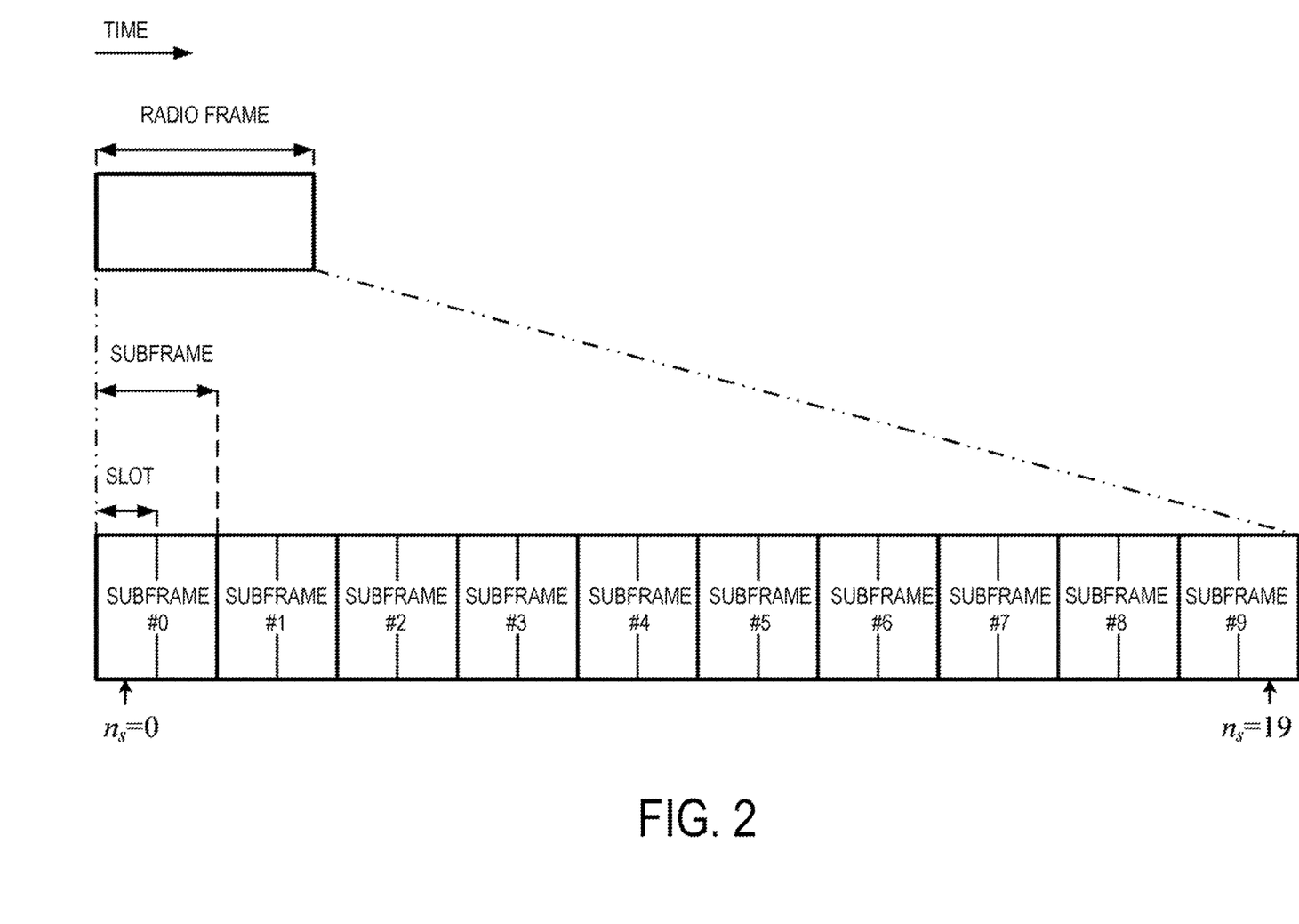
FIG. 2 is a diagram illustrating an example of a structure of a radio frame according to the present embodiment.

FIG. 2 is a diagram illustrating an example of a structure of a radio frame according to the present embodiment. In FIG. 2, the horizontal axis is a time axis.

Each of the radio frames may include ten contiguous subframes in the time domain. Each of subframes i may include two contiguous slots in the time domain. The two contiguous slots in the time domain are a slot having a slot number $n_s$ of 2i in the radio frame and a slot having a slot number $n_s$ of 2i+1 in the radio frame. Each of the radio frames may include ten contiguous subframes in the time domain. Each of the radio frames includes 20 contiguous slots ($n_s$=0, 1, . . . , 19) in the time domain.

Figure 3:
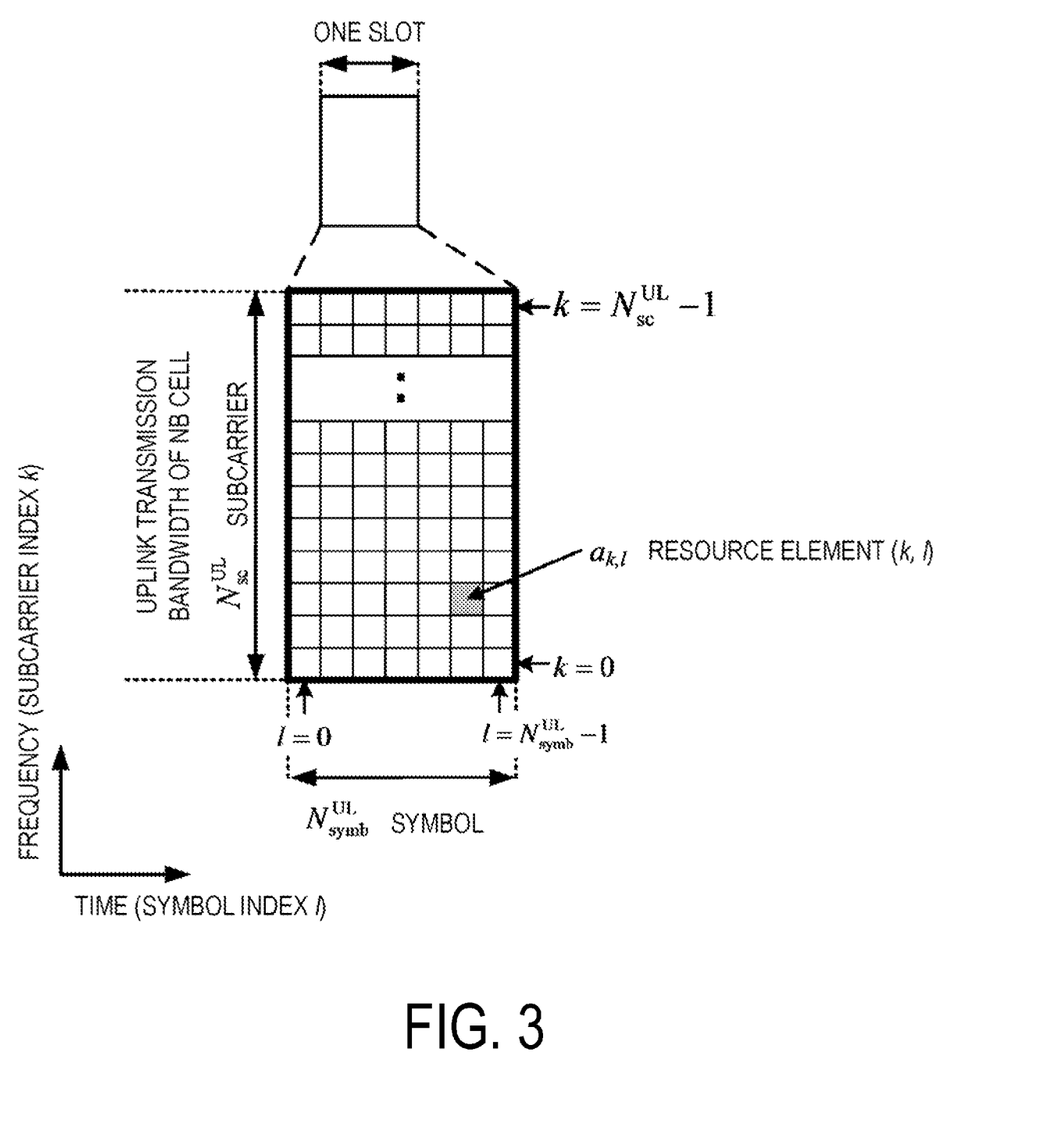
FIG. 3 is a diagram illustrating a schematic configuration of an uplink slot according to the present embodiment.

A configuration of a slot according to the present embodiment will be described below. FIG. 3 is a diagram illustrating a schematic configuration of an uplink slot according to the present embodiment. FIG. 3 illustrates a configuration of an uplink slot in one NB-IoT cell. In FIG. 3, the horizontal axis is a time axis, and the vertical axis is a frequency axis. In FIG. 3, l is a symbol number/index, and k is a subcarrier number/index. A subcarrier is also referred to as a tone.

The physical signal or the physical channel transmitted in each of the slots is expressed by a resource grid. In the uplink, the resource grid is defined by multiple subcarriers and multiple time symbols. Each element within the resource grid is referred to as a resource element. The resource element $a_{k,l}$ is expressed by a subcarrier number/index k and a symbol number/index l.

The resource grid is defined for each antenna port. In the present embodiment, description is given for one antenna port. The present embodiment may be applied to each of multiple antenna ports.

The uplink slot includes multiple symbols l (l=0, 1, . . . , $N^{UL}_{symb}$−1) in the time domain. $N^{UL}_{symb}$ indicates the number of OFDM symbols included in one uplink slot. For a normal Cyclic Prefix (CP), $N^{UL}_{symb}$ may be 7. For an extended Cyclic Prefix (CP), $N^{UL}_{symb}$ may be 6.

In the NB-IoT uplink, a transmission bandwidth configuration (system bandwidth) is 180 kHz. The uplink slot includes multiple subcarriers k (k=0, 1, . . . , $N^{UL}_{SC}$) in the frequency domain. $N^{UL}_{sc}$ is the number of subcarriers in the frequency domain for NB-IoT. In the uplink, a subcarrier interval Δf is 15 kHz or 3.75 kHz. In a case that the uplink subcarrier interval Δf is 15 kHz, $N^{RB}_{sc}$ is a size of 12 subcarriers. In a case that the uplink subcarrier interval Δf is 3.75 kHz, $N^{RB}_{sc}$ is a size of 48 subcarriers.

Figure 4:
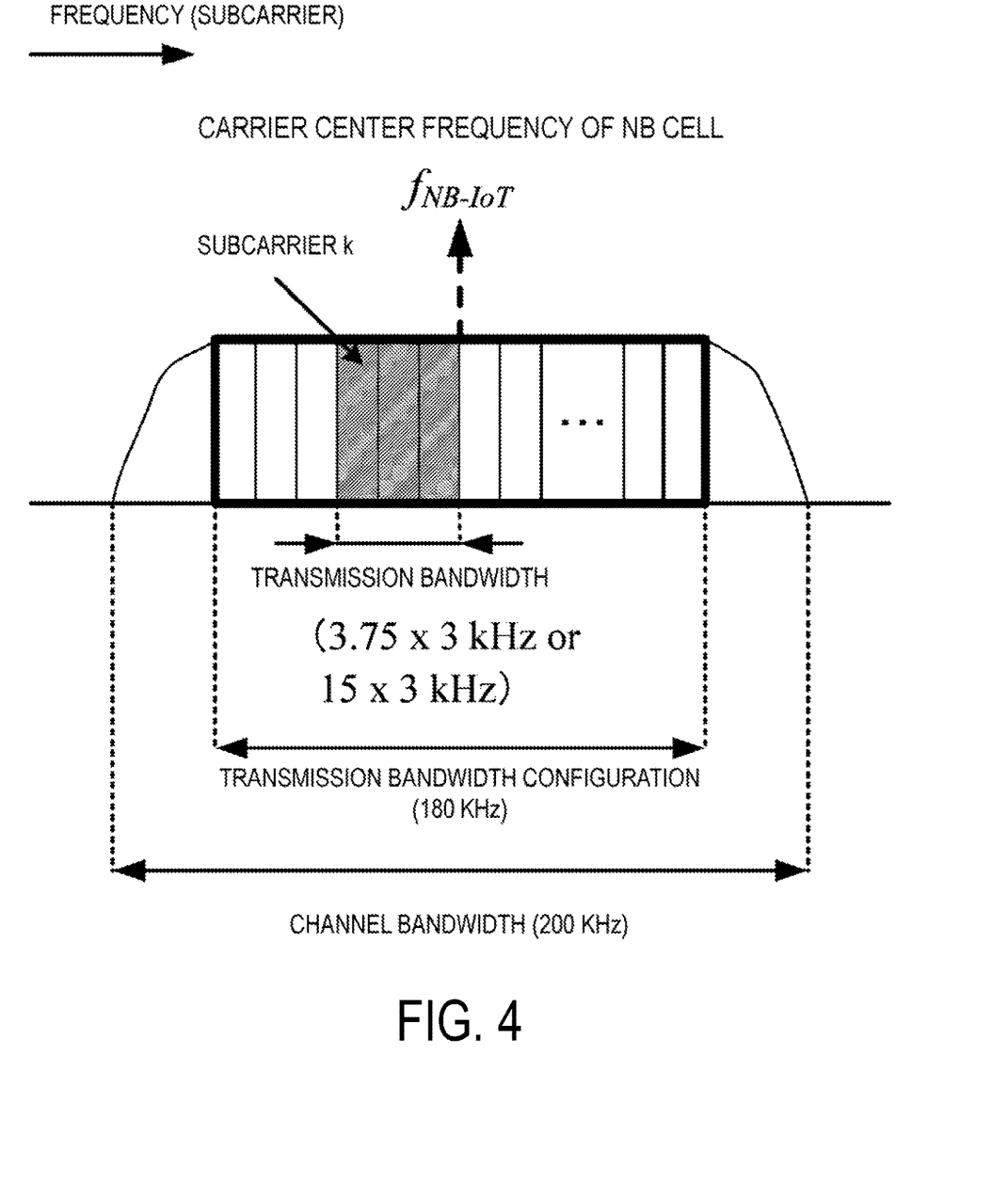
FIG. 4 is a diagram illustrating an example of a channel bandwidth configuration of an NB-IoT cell according to the present embodiment.

FIG. 4 is a diagram illustrating an example of a channel bandwidth configuration of an NB-IoT cell according to the present embodiment. In FIG. 4, the horizontal axis is a frequency axis. The transmission bandwidth configuration of the NB-IoT cell is 180 kHz, and the channel bandwidth of the NB-IoT cell is 200 kHz. The terminal apparatus 1 transmits an uplink signal by using three subcarriers k in one symbol l. The band used by the terminal apparatus 1 for uplink signal transmission is referred to as a transmission bandwidth.

Physical channels and physical signals in the present embodiment will be described.

In FIG. 1, the following downlink physical channels are used for downlink radio communication from the base station apparatus 3 to the terminal apparatus 1. The downlink physical channels are used by the physical layer for transmission of information output from the higher layer.

Narrowband Physical Broadcast Channel (NPBCH)
Narrowband Physical Downlink Control Channel (NPDCCH)
Narrowband Physical Downlink Shared Channel (NPDSCH)

The NPBCH is used to broadcast system information commonly used by the terminal apparatuses 1.

The NPDCCH is used to transmit downlink control information (Narrow Band Downlink Control Information (DCI)) used to schedule the NPDSCH, and downlink control information used to schedule a Narrow Band Physical Uplink Shared Channel (NPUSCH). The downlink control information may include HARQ information.

Cyclic Redundancy Check (CRC) parity bits attached to the downlink control information are scrambled with a Cell-Radio Network Temporary Identifier (C-RNTI) or a Semi Persistent Scheduling (SPS) Cell-Radio Network Temporary Identifier (C-RNTI). The C-RNTI and the SPS C-RNTI are identifiers for identifying a terminal apparatus within a cell. The Temporary C-RNTI is used during a contention based random access procedure. An RNTI attached to the downlink control information is also referred to as the RNTI included in the NPDCCH.

The C-RNTI is used to control the NPDSCH or the NPUSCH in one subframe. The SPS C-RNTI is used to periodically allocate a resource for the NPDSCH or the NPUSCH. The Temporary C-RNTI is used to schedule re-transmission of a random access message 3 and transmission of a random access message 4.

The NPDSCH is used to transmit downlink data (Downlink Shared Channel (DL-SCH)).

In FIG. 1, the following downlink physical signals are used for downlink radio communication from the base station apparatus 3 to the terminal apparatus 1. The downlink physical signals are not used for transmission of information output from the higher layer, but are used by the physical layer.

Narrowband Synchronization Signal (NSS)
Narrowband Downlink Reference Signal (NDL RS)

The NSS is used for the terminal apparatus 1 to acquire frequency and time synchronization in the downlink of an NB-IoT cell. The NSS includes a Narrowband Primary Synchronization Signal (NPSS) and a Narrowband Secondary Synchronization Signal (NSSS). The NSSS is generated based on a Narrowband Physical layer Cell Identity (NPCI) of the NB-IoT cell. The terminal apparatus 1 may acquire the NPCI of the NB-IoT cell from the NSS.

The NDL RS may be used for the terminal apparatus 1 to perform channel compensation on a downlink physical channel of the NB-IoT cell. The NDL RS may be used for the terminal apparatus 1 to calculate downlink channel state information of the NB-IoT cell.

In FIG. 1, the following uplink physical channels are used for uplink radio communication from the base station apparatus 3 to the terminal apparatus 1. The uplink physical channels are used by a physical layer for transmission of information output from a higher layer.

Narrowband Physical Random Access Channel (NPRACH)
Narrowband Physical Uplink Shared Channel (NPUSCH)

The NPUSCH may be used for transmission of uplink data (UpLink-Shared CHannel (UL-SCH)) and/or uplink control information. The uplink control information includes Hybrid Automatic Repeat reQuest ACKnowledgment (HARQ-ACK) corresponding to the NPDSCH (downlink data). In the present embodiment, one NPUSCH transmission corresponds to one or a plurality of subcarriers. For example, the number of subcarriers for one NPUSCH transmission is selected among the numbers 1, 3, 6, and 12. A different NPUSCH transmission may correspond to a different subcarrier. A different NPUSCH transmission may correspond to a different number of subcarriers.

In FIG. 1, the following uplink physical signal is used for uplink radio communication from the base station apparatus 3 to the terminal apparatus 1. The uplink physical signal is not used for transmission of information output from the higher layer, but is used by the physical layer.

Narrowband Downlink Reference Signal (NUL RS)

The NUL RS may be used for the base station apparatus 1 to perform channel compensation on an uplink physical channel of an NB-IoT cell. The NUL RS may be used for the terminal apparatus 1 to calculate uplink channel state information of the NB-IoT cell. The NUL RS may be mapped to a subcarrier identical to a subcarrier of the corresponding NPUSCH. The NUL-RS may be time-multiplexed with the NPUSCH. The NUL RS is also referred to as a Demodulation Reference Signal (DMRS), an uplink reference signal, or a reference signal.

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The DL-SCH is a transport channel. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and coding processing is performed for each codeword.

The base station apparatus 3 and the terminal apparatus 1 exchange (transmit and/or receive) a signal in the higher layer. For example, the base station apparatus 3 and the terminal apparatus 1 may transmit and/or receive, in a Radio Resource Control (RRC) layer, RRC signaling (also referred to as a Radio Resource Control message (RRC message) or Radio Resource Control information (RRC information)). Furthermore, the base station apparatus 3 and the terminal apparatus 1 may transmit and/or receive, in the Medium Access Control (MAC) layer, a MAC Control Element (CE). Here, the RRC signaling and/or the MAC CE is also referred to as higher layer signaling.

The NPDSCH is used to transmit the RRC signaling and the MAC CE. Here, the RRC signaling transmitted from the base station apparatus 3 on the NPDSCH may be signaling common to multiple terminal apparatuses 1 in a cell. The RRC signaling transmitted from the base station apparatus 3 on the NPDSCH may be signaling dedicated to a certain terminal apparatus 1 (also referred to as dedicated signaling or UE specific signaling). A cell-specific parameter may be transmitted by using the signaling common to the multiple terminal apparatuses 1 in the cell or the signaling dedicated to the certain terminal apparatus 1. A UE-specific parameter may be transmitted by using the signaling dedicated to the certain terminal apparatus 1.

Physical channels (NPDCCH, NPDSCH, and NPUSCH) corresponding to the same data (transport block) may be repeatedly transmitted in contiguous subframes. Repetition Levels (RL) of the physical channels may be controlled for each physical channel. The repetition level 1 means that the physical channel corresponding to the same data is not repeatedly transmitted. The repetition level larger than 1 means that the physical channel corresponding to the same data is repeatedly transmitted. That is, the repetition level is associated with the length of one transmission instance/attempt/bundle of the physical channel in the time domain.

The repetition level may be based on at least some or all of the downlink control information, the RRC signaling, the MAC CE, and a coverage level. The coverage level includes at least a first coverage level and a second coverage level. The coverage level may include three or more coverage levels.

The coverage level is associated with the repetition level. The terminal apparatus 1 for which the first coverage level has been configured may transmit or receive the physical channel having the repetition level of X or less. The terminal apparatus 1 for which the first coverage level has been configured may not transmit or receive the physical channel having the repetition level larger than X. The terminal apparatus 1 for which the second coverage level has been configured may transmit or receive the physical channel having the repetition level larger than X. For example, X may be 1 or 3.

The terminal apparatus 1 may configure the coverage level based on information received from the base station apparatus 3, and a Reference Signal Received Power (RSRP) of a signal (NDL RS) received from the base station apparatus 3. Here, the information may be the downlink control information, the RRC signaling, or the MAC CE.

Configurations of apparatuses according to the present embodiment will be described below.

Figure 5:
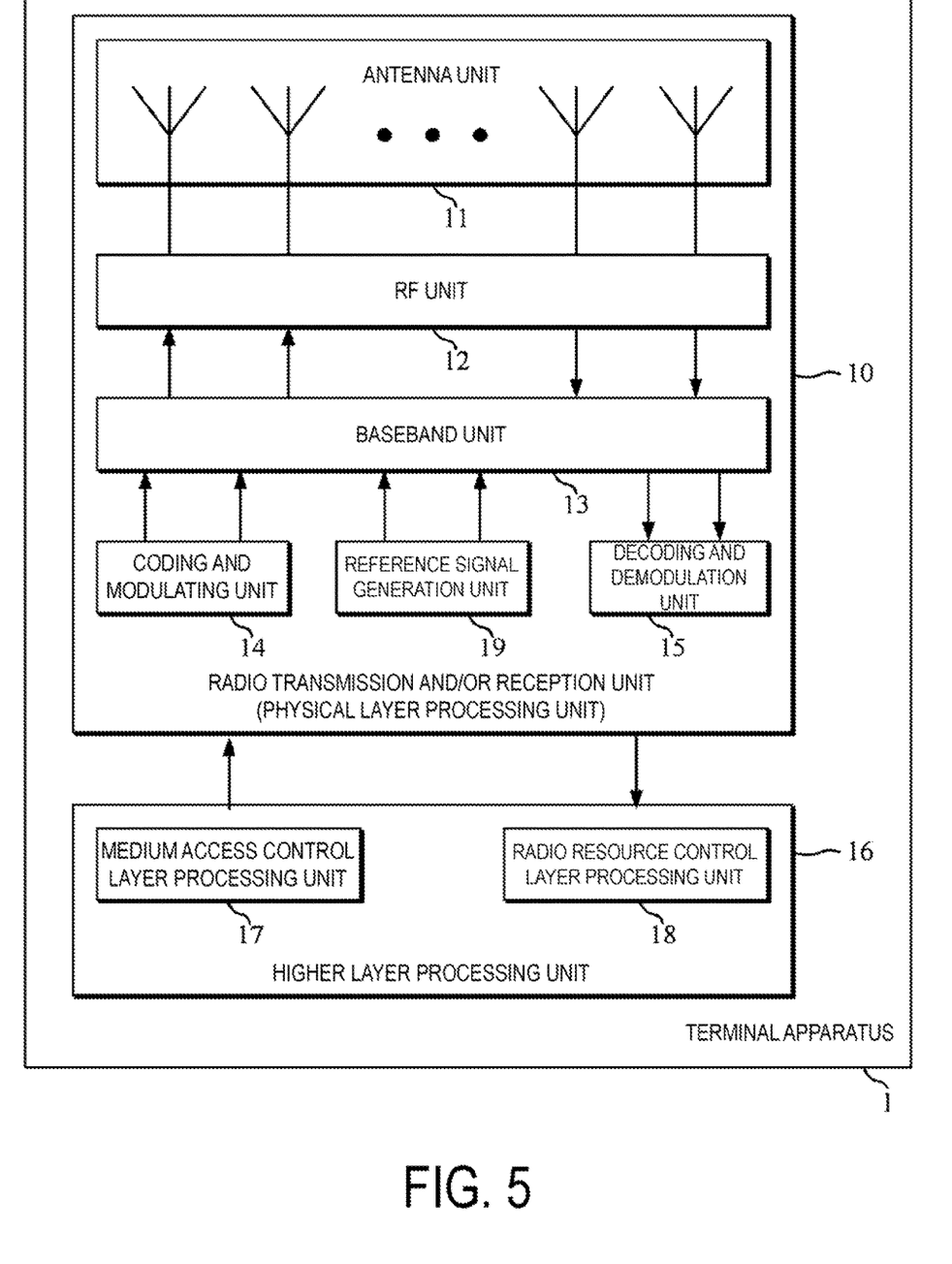
FIG. 5 is a schematic block diagram illustrating a configuration of a terminal apparatus 1 according to the present embodiment.

FIG. 5 is a schematic block diagram illustrating a configuration of the terminal apparatus 1 according to the present embodiment. As illustrated, the terminal apparatus 1 is configured to include a radio transmission and/or reception unit 10 and a higher layer processing unit 16. The radio transmission and/or reception unit 10 is configured to include an antenna unit 11, a Radio Frequency (RF) unit 12, a baseband unit 13, a coding and modulating unit 14, and a decoding and demodulation unit 15. The higher layer processing unit 16 is configured to include a medium access control layer processing unit 17, a radio resource control layer processing unit 18, and a reference signal generation unit 19. The radio transmission and/or reception unit 10 is also referred to as a transmitter, a receiver or a physical layer processing unit. The reference signal generation unit 19 is also referred to as a generation unit.

The higher layer processing unit 16 outputs uplink data (transport block) generated by a user operation or the like, to the radio transmission and/or reception unit 10. The higher layer processing unit 16 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 17 included in the higher layer processing unit 16 performs processing of the Medium Access Control layer. The medium access control layer processing unit 17 controls transmission of a scheduling request, based on various types of configuration information/parameters managed by the radio resource control layer processing unit 18.

The radio resource control layer processing unit 18 included in the higher layer processing unit 16 performs processing of the Radio Resource Control layer. The radio resource control layer processing unit 18 manages the various types of configuration information/parameters of the terminal apparatus 1. The radio resource control layer processing unit 18 sets the various types of configuration information/parameters, based on higher layer signaling received from the base station apparatus 3. That is, the radio resource control layer processing unit 18 sets the various types of configuration information/parameters, based on information indicating the various types of configuration information/parameters received from the base station apparatus 3.

The coding and modulating unit 14 included in the radio transmission and/or reception unit 10 performs processing of the physical layer, such as coding and modulation. The decoding and demodulation unit 15 included in the radio transmission and/or reception unit 10 performs processing of the physical layer, such as decoding and demodulation. The reference signal generation unit 19 included in the radio transmission and/or reception unit 10 generates an uplink reference signal. The radio transmission and/or reception unit 10 demultiplexes, demodulates, and decodes a signal received from the base station apparatus 3, and outputs the information resulting from the decoding to the higher layer processing unit 16. The radio transmission and/or reception unit 10 modulates and codes data to generate a transmit signal, and transmits the transmit signal to the base station apparatus 3. The radio transmission and/or reception unit 10 transmits, to the base station apparatus 3, the uplink reference signal generated by the reference signal generation unit 19 as a transmit signal in a prescribed OFDM symbol.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) on the signal from which the CP has been removed, and extracts a signal in the frequency domain.

The baseband unit 13 generates a baseband digital signal and converts the baseband digital signal to an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

Figure 6:
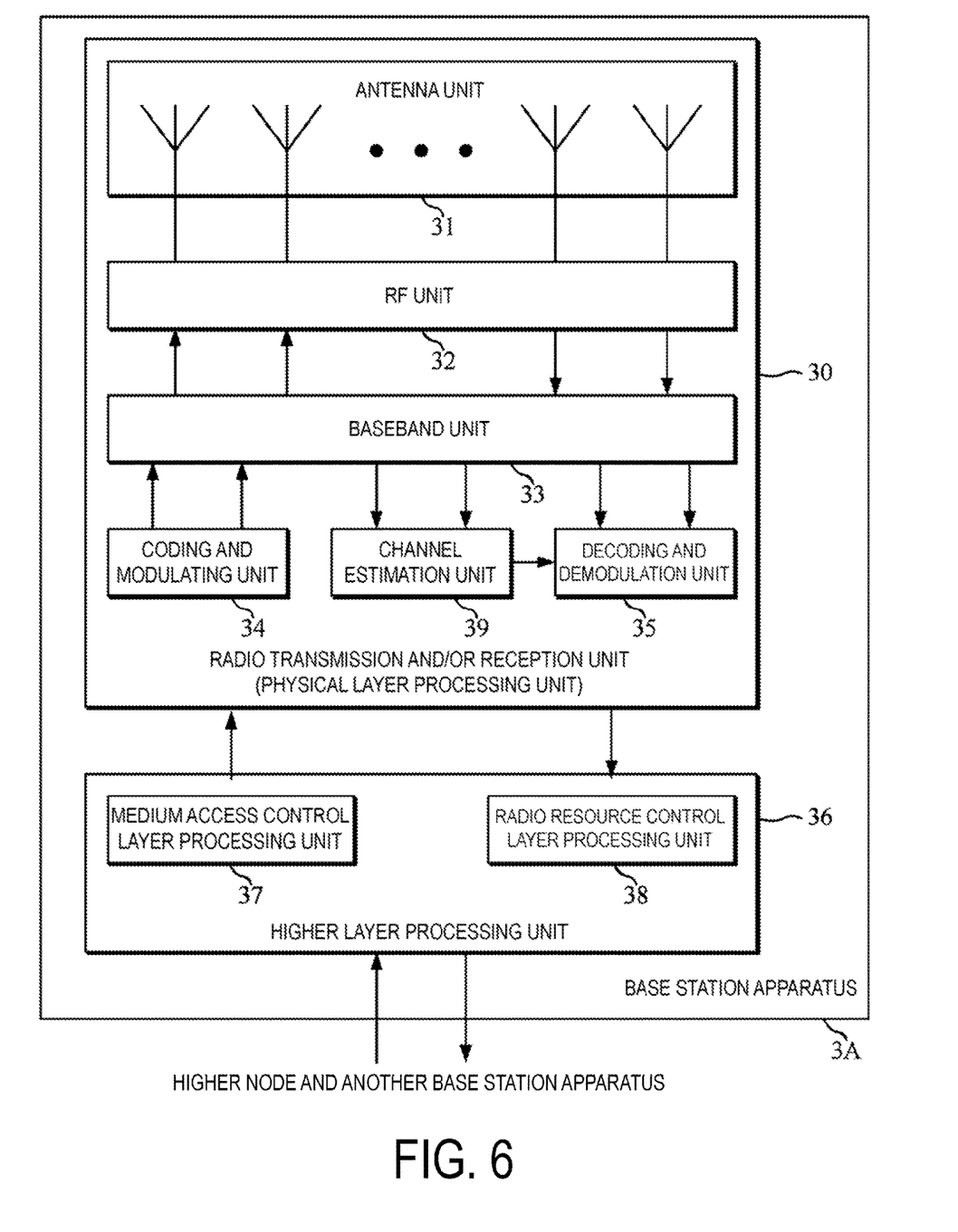
FIG. 6 is a schematic block diagram illustrating a configuration of a base station apparatus 3 according to the present embodiment.

FIG. 6 is a schematic block diagram illustrating a configuration of the base station apparatus 3A according to the present embodiment. The configuration of the base station apparatus 3A is the same as a configuration of the base station apparatus 3B. As illustrated, the base station apparatus 3A is configured to include a radio transmission and/or reception unit 30 and a higher layer processing unit 36. The radio transmission and/or reception unit 30 is configured to include an antenna unit 31, an RF unit 32, a baseband unit 33, a coding and modulating unit 34, and a decoding and demodulation unit 35. The higher layer processing unit 36 is configured to include a medium access control layer processing unit 37, a radio resource control layer processing unit 38, and a channel estimation unit 39. The radio transmission and/or reception unit 30 is also referred to as a transmitter, a receiver or a physical layer processing unit.

The higher layer processing unit 36 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 37 included in the higher layer processing unit 36 performs processing of the Medium Access Control layer. The medium access control layer processing unit 37 performs processing associated with a scheduling request, based on various types of configuration information/parameters managed by the radio resource control layer processing unit 38.

The radio resource control layer processing unit 38 included in the higher layer processing unit 36 performs processing of the Radio Resource Control layer. The radio resource control layer processing unit 38 generates, or acquires from a higher node, downlink data (transport block) allocated on a physical downlink shared channel, system information, an RRC message, a MAC Control Element (CE), and the like, and outputs the generated or acquired data to the radio transmission and/or reception unit 30. Furthermore, the radio resource control layer processing unit 38 manages various types of configuration information/parameters for each of the terminal apparatuses 1. The radio resource control layer processing unit 38 may set various types of configuration information/parameters for each of the terminal apparatuses 1 via the higher layer signaling. In other words, the radio resource control layer processing unit 38 transmits/broadcasts information indicating various types of configuration information/parameters.

The channel estimation unit 39 included in the radio transmission and/or reception unit 30 performs an estimation of a channel from the terminal apparatus 1 by using an uplink reference signal received from the terminal apparatus 1. Channel compensation of an uplink physical channel is performed. The decoding and demodulation unit 35 included in the radio transmission and/or reception unit 30 performs channel compensation by using performance of the channel estimated by the channel estimation unit 39, and performs physical layer processing such as decoding and demodulation of a signal received from the terminal apparatus 1. The other functionalities included in the radio transmission and/or reception unit 30 is similar to those of the radio transmission and/or reception unit 10, and hence description thereof is omitted.

Each of the units having the reference signs 10 to 19 included in the terminal apparatus 1 may be configured as a circuit. Each of the units having the reference signs 30 to 39 included in the base station apparatus 3 may be configured as a circuit.

Frequency allocation for an NPUSCH and a reference signal, and/or a cyclic shift applied to the reference signal according to the present embodiment will be described below.

Figure 7:
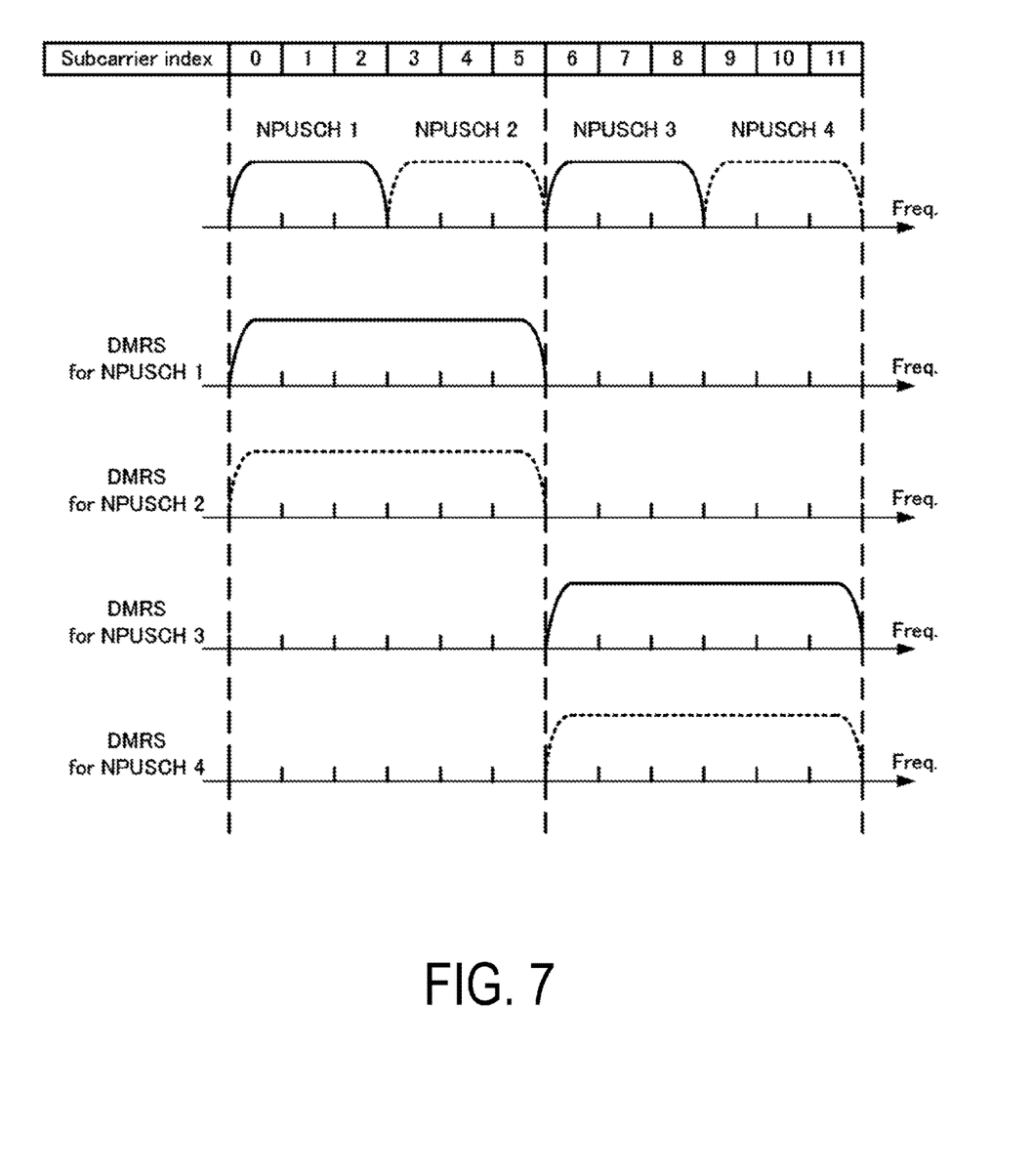
FIG. 7 is a diagram illustrating an example of frequency allocation for an NPUSCH and a reference signal corresponding to the NPUSCH according to the present embodiment.

FIG. 7 is a diagram illustrating an example of frequency allocation for an NPUSCH and a reference signal corresponding to the NPUSCH according to the present embodiment. As illustrated, 12 subcarriers having indexes 0 to 11 exist on a frequency, an NPUSCH 1 is allocated on three subcarriers having subcarrier indexes 0 to 2, an NPUSCH 2 is allocated on three subcarriers having subcarrier indexes 3 to 5, an NPUSCH 3 is allocated on three subcarriers having subcarrier indexes 6 to 8, and an NPUSCH 4 is allocated on three subcarriers having subcarrier indexes 9 to 11. In a case that a reference signal corresponding to the NPUSCH 1 is transmitted, or in a case that a reference signal corresponding to the NPUSCH 2 is transmitted, the terminal apparatus 1 allocates the reference signal on six subcarriers having subcarrier indexes 0 to 5. In a case that a reference signal corresponding to the NPUSCH 3 is transmitted, or in a case that a reference signal corresponding to the NPUSCH 4 is transmitted, the terminal apparatus 1 allocates the reference signal on six subcarriers having subcarrier indexes 6 to 11.

Figure 8:
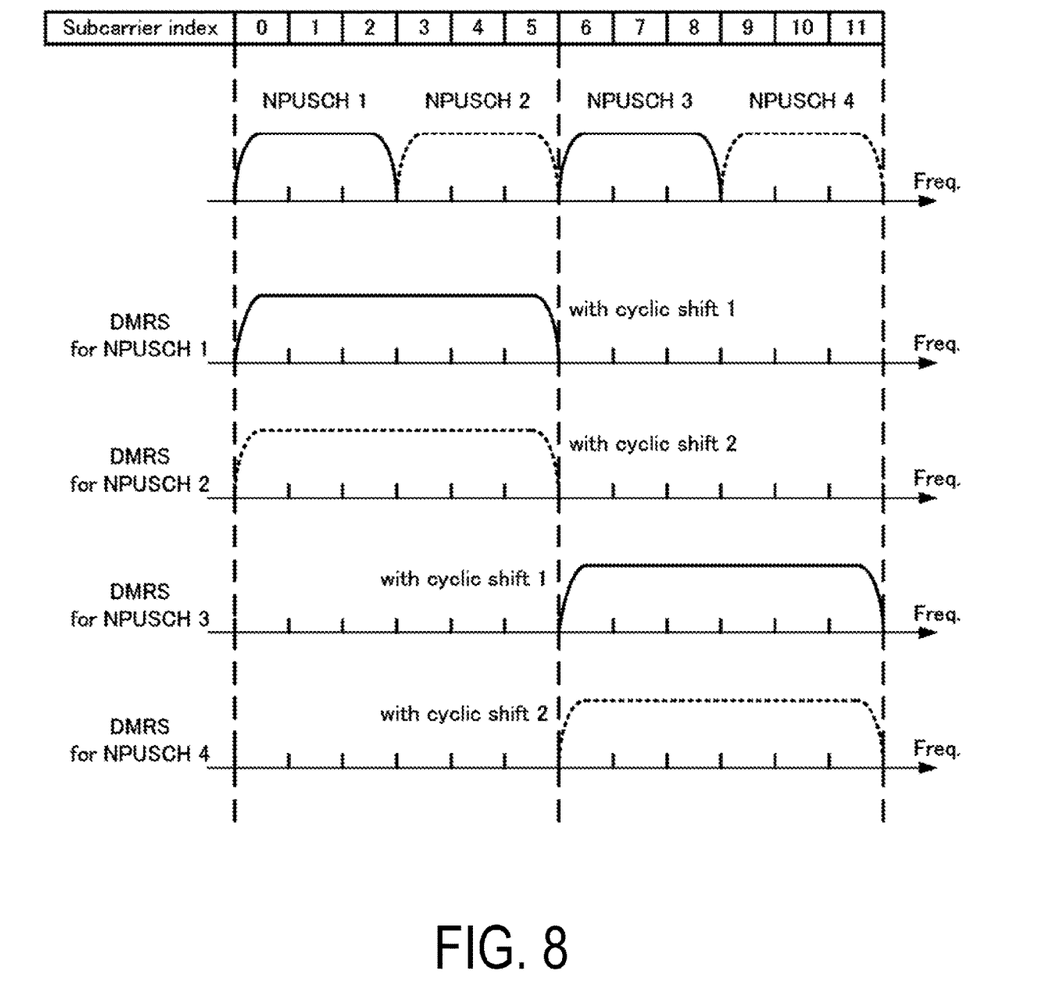
FIG. 8 is a diagram illustrating an example of frequency allocation for an NPUSCH and a reference signal corresponding to the NPUSCH, and cyclic shift according to the present embodiment.

FIG. 8 is a diagram illustrating an example of frequency allocation for an NPUSCH and a reference signal corresponding to the NPUSCH, and cyclic shift according to the present embodiment. Frequency allocation to the NPUSCH 1, the NPUSCH 2, the NPUSCH 3, and the NPUSCH 4 is similar to that in FIG. 7. In a case that a reference signal corresponding to the NPUSCH 1 is transmitted, the terminal apparatus 1 applies a cyclic shift 1 to the generated reference signal and allocates the reference signal on six subcarriers, i.e., subcarriers 0 to 5. In a case that a reference signal corresponding to the NPUSCH 2 is transmitted, the terminal apparatus 1 applies a cyclic shift 2 to the generated reference signal and allocates the reference signal on six subcarriers, i.e., the subcarriers 0 to 5. In a case that a reference signal corresponding to the NPUSCH 3 is transmitted, the terminal apparatus 1 applies the cyclic shift 1 to the generated reference signal and allocates the reference signal on six subcarriers, i.e., subcarriers 6 to 11. In a case that a reference signal corresponding to the NPUSCH 4 is transmitted, the terminal apparatus 1 applies the cyclic shift 2 to the generated reference signal and allocates the reference signal on six subcarriers, i.e., the subcarriers 6 to 11. By applying, as described above, different cyclic shifts to a reference signal in the case of the transmission of the NPUSCH 1 and a reference signal in the case of the transmission of the NPUSCH 2, it is possible that a terminal apparatus 1 transmits the NPUSCH 1 and another terminal apparatus 1 transmits the NPUSCH 2, thereby reducing interference between the reference signal corresponding to the NPUSCH 1 and the reference signal corresponding to the NPUSCH 2 even in a case that the NPUSCH 1 and the NPUSCH 2 are frequency-multiplexed. Different orthogonal codes instead of different cyclic shifts may be applied in the case of the transmission of the NPUSCH 1 and in the case of the transmission of the NPUSCH 2 in FIG. 8. Different orthogonal codes and different cyclic shifts may be applied in the case of the transmission of the NPUSCH 1 and in the case of the transmission of the NPUSCH 2 in FIG. 8.

Figure 9:
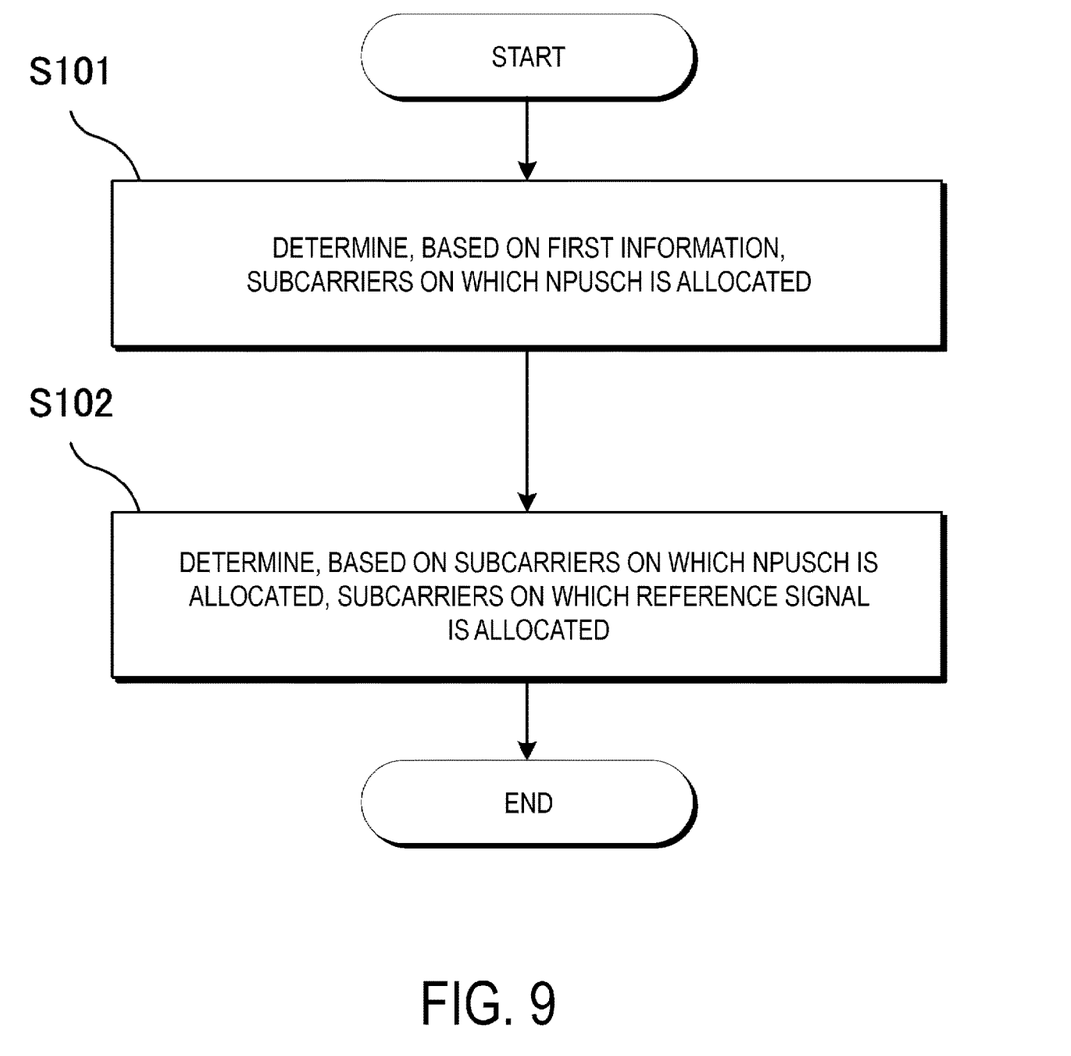
FIG. 9 is a flowchart of a method for locating a reference signal in the terminal apparatus 1 according to the present embodiment.

FIG. 9 is a flowchart of a method for arranging a reference signal in the terminal apparatus 1 according to the present embodiment. In step S101, the terminal apparatus 1 determines, based on first information, subcarriers on which an NPUSCH is allocated. The first information may be DCI received from the base station apparatus 1. In step S102, the terminal apparatus 1 determines subcarriers on which a reference signal corresponding to the NPUSCH is allocated, based on the subcarriers, determined in step S101, on which the NPUSCH is allocated.

Figure 10:
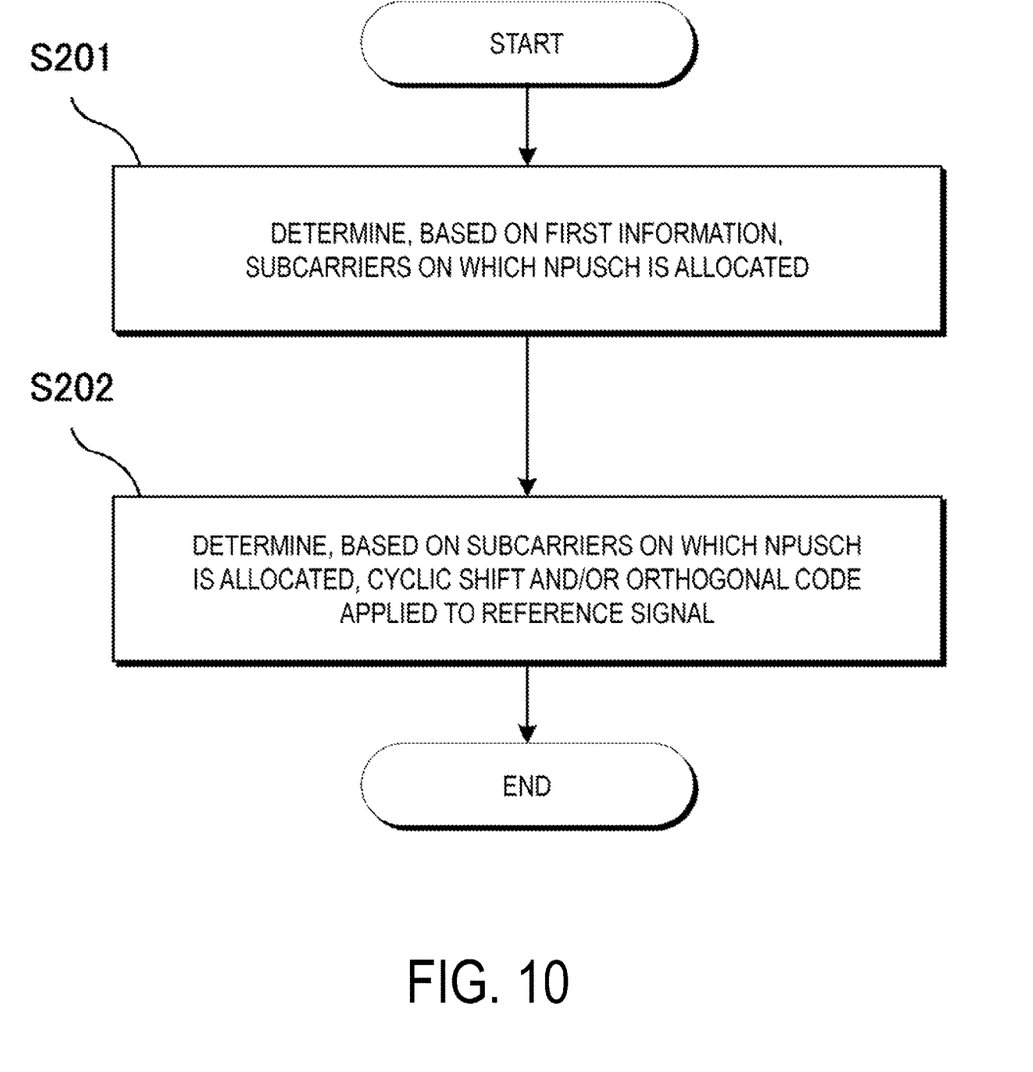
FIG. 10 is a flowchart of a method for determining a cyclic shift and/or an orthogonal code for a reference signal in the terminal apparatus 1 according to the present embodiment.

FIG. 10 is a flowchart of a method for determining a cyclic shift and/or an orthogonal code for a reference signal in the terminal apparatus 1 according to the present embodiment. In step S201, the terminal apparatus 1 determines, based on first information, subcarriers on which an NPUSCH is allocated. The first information may be DCI received from the base station apparatus 1. In step S202, the terminal apparatus 1 determines a cyclic shift and/or an orthogonal code applied to a reference signal corresponding to the NPUSCH, based on the subcarriers, determined in step S201, on which the NPUSCH is allocated.

The flowchart in FIG. 9 and the flowchart in FIG. 10 may be applied in series or in parallel. That is, the terminal apparatus 1 may determine, based on first information, subcarriers on which an NPUSCH is allocated, and based on the determined subcarriers on which the NPUSCH is allocated, determine subcarriers on which a reference signal corresponding to the NPUSCH is allocated and a cyclic shift and/or an orthogonal code applied to the reference signal.

Aspects of the terminal apparatus 1 and the base station apparatus 3 according to the present embodiment will be described below.

(1) A first aspect of the present embodiment is the terminal apparatus 1 including the generation unit 19 configured to generate a reference signal associated with a transmission of an NPUSCH in a subframe, and the transmitter 10 configured to transmit the reference signal, wherein a plurality of first subcarriers include a plurality of second subcarriers and a plurality of third subcarriers, a plurality of fourth subcarriers include a plurality of fifth subcarriers and a plurality of sixth subcarriers, in a case that the NPUSCH is mapped to the plurality of second subcarriers or the plurality of third subcarriers, the reference signal is mapped to the plurality of first subcarriers, and in a case that the NPUSCH is mapped to the plurality of fifth subcarriers or the plurality of sixth subcarriers, the reference signal is mapped to the plurality of fourth subcarriers.

(2) In the first aspect of the present embodiment, the reference signal is generated based on whether the subcarriers to which the NPUSCH is mapped are the plurality of second subcarriers or the plurality of third subcarriers, and the reference signal is generated based on whether the subcarriers to which the NPUSCH is mapped are the plurality of fifth subcarriers or the plurality of sixth subcarriers.

(3) In the first aspect of the present embodiment, a cyclic shift and/or an orthogonal code applied to the reference signal are given based on whether the subcarriers to which the NPUSCH is mapped are the plurality of second subcarriers or the plurality of third subcarriers, and the cyclic shift and/or the orthogonal code applied to the reference signal are given based on whether the subcarriers to which the NPUSCH is mapped are the plurality of fifth subcarriers or the plurality of sixth subcarriers.

(4) In the first aspect of the present embodiment, the cyclic shift and/or the orthogonal code applied in a case that the subcarriers to which the NPUSCH is mapped are the plurality of second subcarriers are the same as the cyclic shift and/or the orthogonal code applied in a case that the subcarriers to which the NPUSCH is mapped are the plurality of fourth subcarriers.

(5) A second aspect of the present embodiment is the base station apparatus 3 including the receiver 30 configured to receive a reference signal associated with reception of an NPUSCH in a subframe, and the channel estimation unit 39 configured to estimate performance of a channel used for the NPUSCH from the reference signal, wherein a plurality of first subcarriers include a plurality of second subcarriers and a plurality of third subcarriers, a plurality of fourth subcarriers include a plurality of fifth subcarriers and a plurality of sixth subcarriers, in a case that the NPUSCH is mapped to the plurality of second subcarriers or the plurality of third subcarriers, the reference signal is mapped to the plurality of first subcarriers, and in a case that the NPUSCH is mapped to the plurality of fifth subcarriers or the plurality of sixth subcarriers, the reference signal is mapped to the plurality of fourth subcarriers.

(6) In the second aspect of the present embodiment, the reference signal is different based on whether the subcarriers to which the NPUSCH is mapped are the plurality of second subcarriers or the plurality of third subcarriers, and the reference signal is different based on whether the subcarriers to which the NPUSCH is mapped are the plurality of fifth subcarriers or the plurality of sixth subcarriers.

(7) In the second aspect of the present embodiment, a cyclic shift and/or an orthogonal code applied to the reference signal are given based on whether the subcarriers to which the NPUSCH is mapped are the plurality of second subcarriers or the plurality of third subcarriers, and the cyclic shift and/or the orthogonal code applied to the reference signal are given based on whether the subcarriers to which the NPUSCH is mapped are the plurality of fifth subcarriers or the plurality of sixth subcarriers.

(8) In the second aspect of the present embodiment, the cyclic shift and/or the orthogonal code applied in a case that the subcarriers to which the NPUSCH is mapped are the plurality of second subcarriers are the same as the cyclic shift and/or the orthogonal code applied in a case that the subcarriers to which the NPUSCH is mapped are the plurality of fourth subcarriers.

Consequently, the terminal apparatus and the base station apparatus can efficiently communicate with each other.

The base station apparatus 3 according to the present invention can also be realized as an aggregation (an apparatus group) constituted of multiple apparatuses. Each of the apparatuses constituting such an apparatus group may include a part or all of functions or functional blocks of the base station apparatus 3 according to the above-described embodiment. The apparatus group needs to include a complete set of functions or functional blocks of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all of the functions of a higher node than an eNodeB.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the apparatuses in the above-described embodiment may be partially enabled by a computer. In such a case, a program for realizing such control functions may be recorded on a computer-readable recording medium to cause a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may be constituted of a digital circuit, or may be constituted of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatus.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention.

Furthermore, a configuration in which a constituent element that achieves the same effect is substituted for the one that is described in the embodiments is also included in the technical scope of the present invention.

CROSS-REFERENCE OF RELATED APPLICATION

This application claims the benefit of priority to JP 2016-054998 filed on Mar. 18, 2016, which is incorporated herein by reference in its entirety.

REFERENCE SIGNS LIST 1 (1A, 1B, 1C, 1D) Terminal apparatus
3 (3A, 3B) Base station apparatus
10 Radio transmission and/or reception unit
11 Antenna unit
12 RF unit 13 Baseband unit
14 Coding and modulating unit
15 Decoding and demodulation unit
16 Higher layer processing unit
17 Medium access control layer processing unit
18 Radio resource control layer processing unit
19 Reference signal generation unit
30 Radio transmission and/or reception unit
31 Antenna unit
32 RF unit
33 Baseband unit
34 Coding and modulating unit
35 Decoding and demodulation unit
36 Higher layer processing unit
37 Medium access control layer processing unit
38 Radio resource control layer processing unit
39 Channel estimation unit

The invention claimed is:

1. A terminal apparatus comprising:
a receiver configured to receive Downlink Control Information (DCI) from a base station apparatus;
generation circuitry configured to generate a Demodulation Reference Signal (DMRS); and
a transmitter configured to transmit (i) a Physical Uplink Shared Channel (PUSCH) and (ii) the DMRS to which a cyclic shift has been applied; wherein
the transmitter determines, based on the DCI, subcarriers which are used for transmitting the PUSCH, and
the generation circuitry determines the cyclic shift based on the subcarriers.

2. The terminal apparatus according to claim 1, wherein
the transmitter is further configured to determine, based on the subcarriers which are used for transmitting the PUSCH, subcarriers for transmitting the DMRS.

3. A base station apparatus comprising:
a transmitter configured to transmit Downlink Control Information (DCI) which indicates subcarriers; and
a receiver configured to receive a Physical Uplink Shared Channel (PUSCH) and a Demodulation Reference Signal (DMRS); wherein
the receiver uses the subcarriers for receiving the PUSCH, and
the DMRS is a signal to which a cyclic shift determined based on the subcarriers has been applied.

4. The base station apparatus according to claim 3, wherein
subcarriers for receiving the DMRS are determined based on the subcarriers for receiving the PUSCH.

5. A communication method used for a terminal apparatus, the communication method comprising the steps of:
receiving Downlink Control Information (DCI) from a base station apparatus;
determining, based on the DCI, subcarriers which are used for transmitting a Physical Uplink Shared Channel (PUSCH);
generating a Demodulation Reference Signal (DMRS);
determining a cyclic shift based on the subcarriers; and
transmitting (i) a Physical Uplink Shared Channel (PUSCH) and (ii) the DMRS to which the cyclic shift has been applied.

6. A communication method used for a base station apparatus, the communication method comprising the steps of:
transmitting Downlink Control Information (DCI) which indicates subcarriers;
receiving a Physical Uplink Shared Channel (PUSCH) with use of the subcarriers for receiving the PUSCH; and
receiving a Demodulation Reference Signal (DMRS); wherein
the DMRS is a signal to which a cyclic shift determined based on the subcarriers has been applied.

* * * * *